May 3, 1927.
G. C. MONCKMEIER
1,627,401
WEAR COMPENSATING BOLT
Filed Oct. 19, 1925   2 Sheets-Sheet 1
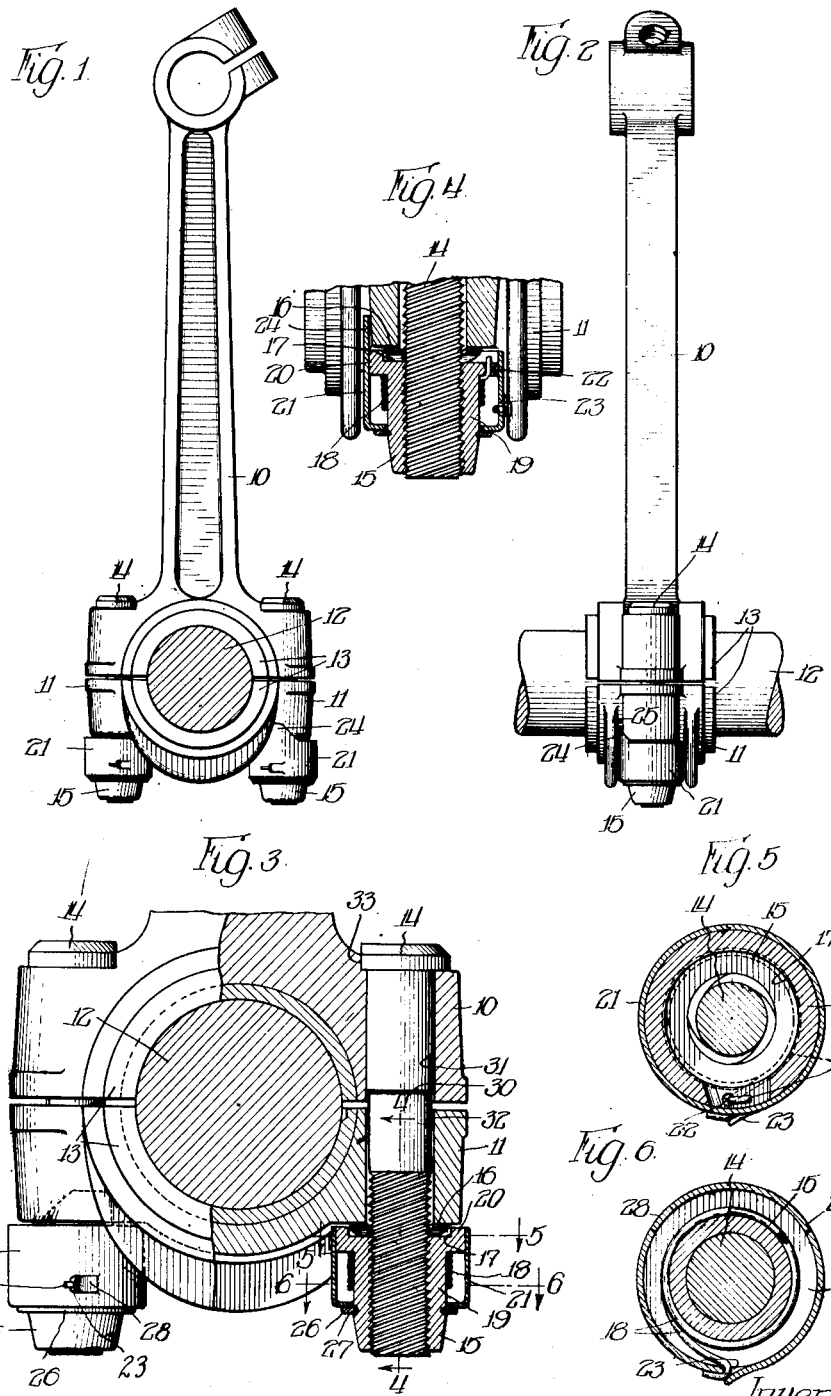
Witness:
G. Burkhardt
Inventor:
Gustav C. Monckmeier,
By Cromwell Greist & Warden
Attys.

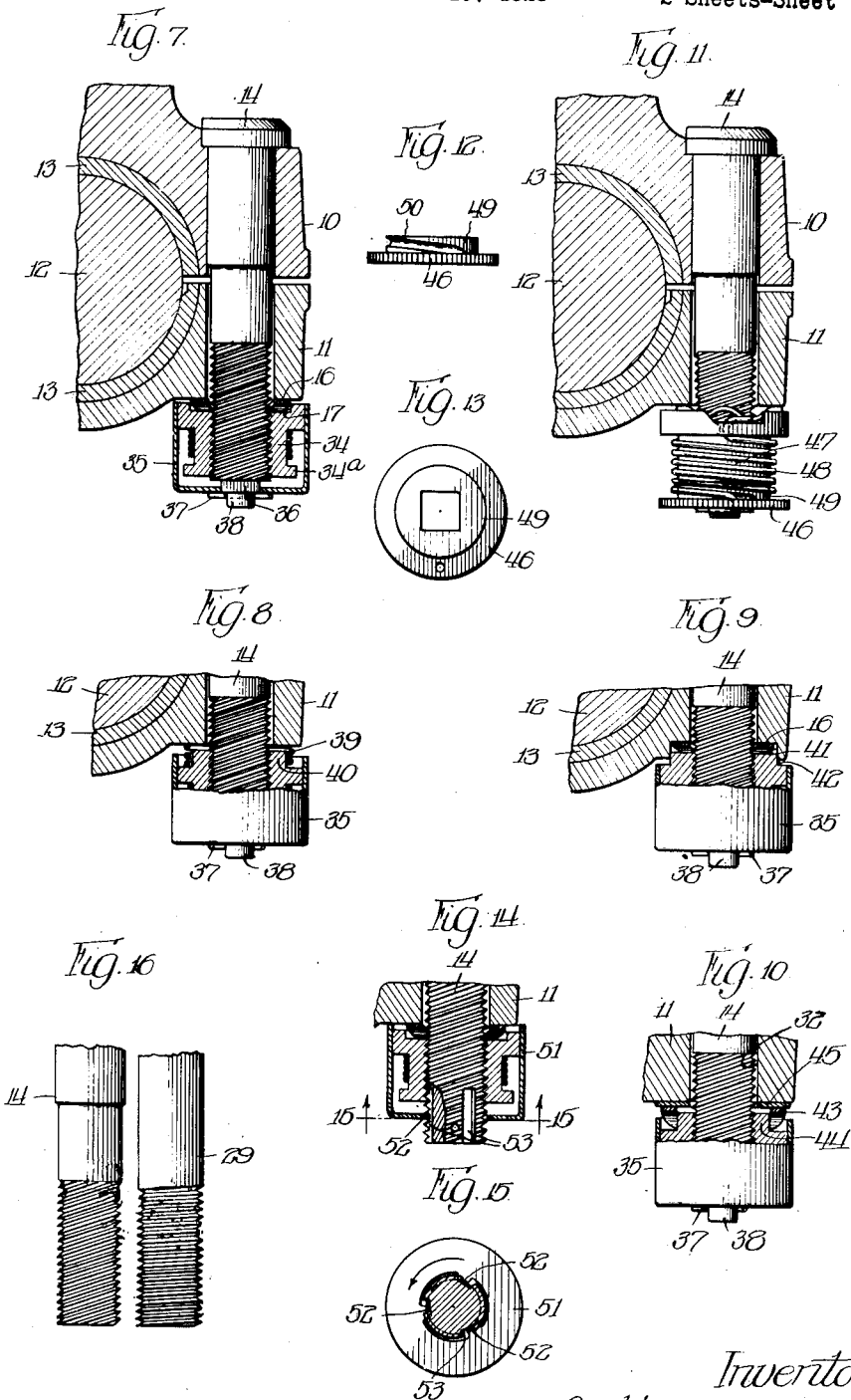

Patented May 3, 1927.

1,627,401

UNITED STATES PATENT OFFICE.

GUSTAV C. MONCKMEIER, OF TIPTON, IOWA.

WEAR-COMPENSATING BOLT.

Application filed October 19, 1925. Serial No. 63,238.

The invention relates to bolts of the type in which the nut is automatically advanced on the bolt by a spring as wear occurs between the parts clamped by the bolt.

The object of the invention is to provide an improved wear compensating bolt which, like the bolt forming the subject matter of my earlier application Serial No. 713,151 filed May 14, 1924, now Patent No. 1,585,309, dated May 18, 1926, is adapted to compensate, not only for shrinkage between the parts clamped, but for temporary limited expansion between the parts, such as occurs when a journal heats in service, and when an out-of-round journal rotates both before and after becoming heated.

The bolt of the invention is characterized by several particularly advantageous features. The compensating spring of the bolt is compactly housed, and the cup which encases the spring serves as an anchorage for one end of the same. The torque thus imposed on the cup by the spring is transmitted independently of the bolt to one of the parts clamped by the same. The threads of the bolt are set at a much greater helix angle than the threads of ordinary bolts, which arrangement permits a material reduction in the clamping pressure exerted by the nut without necessitating a sacrifice in the strength and durability of the spring, and also permits the nut to be advanced by the spring a substantial distance axially of the bolt without fully exhausting the tension stored up in the spring. The shank of the bolt is reduced in diameter where it passes through the movable element of the parts clamped together, in order to give such element freedom of movement without destroying the fixed relation which should exist between the bolt and the other element. Each of the above mentioned features marks the bolt of the invention as a distinct improvement over the devices which others have heretofore developed in attempts to solve the problem of wear compensation.

While the foregoing statements are indicative of the nature of the invention, other objects and advantages will be evident to those skilled in the art upon a full comprehension of the novel construction, arrangement and manner of operation of the bolt of the invention.

In order that the invention may be readily understood, several slightly differing structural embodiments of the same are herein illustrated and described. It should be understood, however, that the invention is not limited to the precise details of construction employed in the presentation of those embodiments, as such details are used merely for the purpose of exemplification, and are not intended to restrict the invention short of its comprehensive scope as defined by the appended claims.

In the accompanying drawings:

Fig. 1 is a side view of a connecting rod of an internal combustion motor, showing the rod as equipped with the bolts of the invention;

Fig. 2 is a different side view of the rod;

Fig. 3 is a partially sectioned view of that portion of the rod with which the bolts are associated;

Fig. 4 is a sectional view taken on the line 4—4 of Fig. 3;

Fig. 5 is a sectional view taken on the line 5—5 of Fig. 3;

Fig. 6 is a sectional view taken on the line 6—6 of Fig. 3;

Fig. 7 is a sectional view corresponding generally to Fig. 3 but showing a modification;

Fig. 8 is a sectional view showing another modification;

Fig. 9 is a similar sectional view showing another modification;

Fig. 10 is a sectional view showing another modification;

Fig. 11 is a sectional view showing still another modification;

Fig. 12 is a side view of the washer shown in Fig. 11;

Fig. 13 is a top plan view of the washer;

Fig. 14 is a sectional view showing another modification;

Fig. 15 is a sectional view taken on the line 15—15 of Fig. 14; and

Fig. 16 is a view showing the threads of the bolt of the invention in comparison with the threads of an ordinary bolt.

The bolt of the invention obviously has a wide range of use, but as it is especially well suited for application to the bearings in internal combustion motors, where wear is constantly occurring and access to the wearing parts cannot be easily had, the bolt is herein exemplified in such specific association.

The drawings show a typical connecting rod bearing assembly, consisting of a connecting rod 10, a bearing cap 11, a crank shaft journal 12 encompassed by complementary portions of the rod and cap, two semi-cylindrical bearings 13 interposed between such portions and the journal, and two bolts 14 adjustably clamping such portions. Each of the bolts 14 embodies the invention.

The bolt 14, in that form of the invention shown in Figs. 1 to 6 inclusive, has screwed thereon a tubular nut 15. An undulate reaction spring 16 is compressed between the nut 15 and the bearing cap 11 in an annular groove 17 provided in the front end of the nut, and a helical compensating spring 18 is tensioned about the tubular portion 19 of the nut. An annular flange 20 is provided on the front end of the nut, and a centrally apertured cup 21 fits over the rear end of the nut and extends forwardly to the flange, upon which it is rotatably positioned. The spring 18 is anchored at its front end to the nut 15 by being hooked through an aperture 22 in the flange 20 and is anchored at its rear end to the cup 21 by being hooked through any one of several circumferentially spaced apertures 23 in the side of the cup. The edges of the aperture 22 in the flange 20 of the nut are preferably rounded off, as shown, to prevent the spring from wearing thereon. The cup 21 is held against rotation in a direction which would unwind the spring by a forwardly extending projection 24 at one side of the cup which serves to abut tangentially of the same against an abrupt shoulder 25 on the bearing cap 11. The cup is prevented from moving rearwardly on the nut into a position out of engagement with the shoulder on the cap by a split ring 26 which is removably seated on an annular groove 27 formed in the nut just rearwardly of the cup.

The cup 21, which effectively encases the spring 18 and prevents the same from being subjected to the destructive wear of coil against coil caused by the splashing of oil thereagainst, is preferably a thin sheet metal stamping. The apertures 23 in the cup may advantageously be formed by punching out small tongues 28, since when the hooked end of the spring 18 is positioned in one of the apertures the associated tongue will bear against such end and will tend to prevent the same from becoming accidentally unhooked. The apertures other than the one in which the end of the spring is positioned may be closed by the associated tongues, thus further increasing the effectiveness of the cup as a casing for the spring.

The wear compensating bolts heretofore produced have exerted clamping pressures of from 15 to 20 pounds, notwithstanding the fact that such high pressures are oftentimes extremely undesirable. Various attempts have been made to obtain lower clamping pressure by the obvious method of lowering the tension in the spring, but it was found that if the spring was wound a less amount the tension would become exhausted before the nut was advanced very far, while if a lighter spring was substituted it would not have sufficient durability. The bolt of the invention, as distinguished from the bolts of the prior art, is capable of producing a clamping pressure as low as desired without in any way sacrificing durability or efficiency of operation. Pressures as low as 2 pounds have been obtained. The threads of the bolt are materially different from those of any bolt heretofore produced for the same general purpose. It will be observed in Fig. 16, where the threads of the bolt of the invention are shown in comparison with those of an ordinary bolt 29, that the threads are multiple and arranged in such a way as to increase greatly the helix angle of the same. According to standard specifications, an ordinary ⅜ inch V-thread bolt has from 16 to 24 threads to the inch, and has a lead (which is the distance a thread advances axially in one turn) for each thread equal to the pitch (which is the distance between a point on one thread and a corresponding point on the next thread), giving a relatively flat helix angle; while a ⅜ inch V-thread bolt constructed in accordance with the invention and having about the same number of threads to the inch will have a lead from 3 to 6 times greater than the pitch, giving a relatively steep helix angle. When the nut on the ordinary bolt is turned a complete revolution, it will only advance on the bolt from 1/16 to ⅛ of an inch, but when the nut on the bolt of the invention is turned a similar amount, it will advance anywhere from 3/16 to ⅜ of an inch. As a result, the leverage which the spring exerts through the nut is cut down, and the pressure exerted by the nut against the bearing cap is as a consequence substantially decreased without resorting to the employment of a lighter and less durable spring. Furthermore, the nut will take up a much greater amount of wear between the parts clamped without materially exhausting the tension stored up in the spring.

The shank of the bolt is reduced slightly in diameter from a point 30 just above the bearing cap 11 to the lower end of the shank, and fits tightly in the connecting rod aperture 31 and loosely in the bearing cap aperture 32. The bearing cap as a result will not bind on the shank of the bolt, and is capable of being moved freely along the shank by the nut 15. The head of the bolt has a flattened side 33 which fits in the usual manner against a shoulder on the connecting rod and holds the bolt against rotation in either direction.

The bolt may be installed in a connecting rod bearing assembly in the following manner:

The bolt is inserted through the aligned apertures 31 and 32 in the connecting rod 10 and bearing cap 11, the reaction spring 16 is seated in the groove 17 in the front end of the nut 15, and the nut is screwed upwardly on the shank of the bolt a sufficient distance to place the cap 11 in the desired position relative to the rod 10. The cup 21 is shifted downwardly on the nut 15, the split ring 26 having first been removed, and is rotated to the right to wind up the spring 18. When the spring 18 has received sufficient tension, the cup 21 is shifted upwardly again on the nut 15 and is permitted to turn to the left until the projection 24 on the cup locks with the shoulder 25 on the bearing cap. The split ring 26 is then reinserted in the groove 27. It will be understood, of course, that as wear occurs in the bearing, the spring 18 will cause the nut 15 to advance on the bolt, and that conditions such as expansion of the journal 12 under heating will be taken care of by the limited retraction of the cap 11 as permitted by the spring 16.

In Fig. 7 is shown a slightly modified form of the invention in which the nut 34 on the bolt is shorter, and the cup 35 extends beyond the rear end of the nut and has a polygonal aperture in the bottom which seats over a polygonal portion 36 of the bolt. A flange 34ª is positioned at the rear end of the nut to prevent the spring from slipping rearwardly from the nut onto the threads of the bolt. The cup 35 does not have any projection which interlocks with a shoulder on the bearing cap 11, as the portion 36 of the bolt holds the cup against rotation. The cup is maintained in engagement with the portion 36 by means of a removable cotter pin 37 which passes through a cylindrical portion 38 at the extreme end of the bolt. This particular feature is covered in my copending application, Serial No. 135,167, filed September 13, 1926.

In Figs. 8, 9 and 10 are shown other forms of the invention which are in many respects quite similar to the form shown in Fig. 7. In Fig. 8 a short coil spring 39 is used in place of the undulate spring 16, and the spring 39 closely encircles a tubular projection 40 on the front end of the nut. In Fig. 9 the undulate spring 16, instead of being positioned in the annular groove 17 in the nut, is seated in an annular groove 41 in the bearing cap 11, and the nut is provided with an annular shoulder 42 which is so proportioned as to abut against the cap 11 before the spring 16 is entirely flattened. In Fig. 10 a large undulate spring 43 is employed, and the spring, instead of seating in a groove which immediately surrounds the bolt, encompasses a forwardly extending tubular projection 44 on the front end of the nut and is positioned by such projection in fixed relation to the bolt. The portions of the nut and cap which are adapted to abut against each other when the spring 43 yields have interposed therebetween a hardened washer 45 which prevents the otherwise exposed edge of the aperture 32 in the cap from becoming deformed under the hammering action of the nut.

In Figs. 11 to 13 inclusive is shown another modified form of the invention in which a washer 46 having a polygonal aperture fits over a polygonal portion of the bolt. The washer is held in place by a cotter pin which passes through the end of the bolt, and the cup shown in the previously described forms is dispensed with. The nut has a cylindrical portion 47 about which most of the coils of the spring 48 are wound, and the washer 46 has a short cylindrical portion 49 about which the lower coil of the spring is guided. The cylindrical portion 49 of the washer is preferably provided with a helical groove 50 for positioning the lower coil of the spring properly, and the flat portion of the washer has an aperture through which the lower end of the spring is hooked.

In Figs. 14 and 15 is shown still another modified form of the invention which differs from that shown in Fig. 7 only in the manner in which the cup 51 is locked against rotation after it has been turned to the right to wind up the associated spring. The centrally apertured portion of the cup is provided with a plurality of inwardly extending tongues 52 which are cut on a radius less than the crest of the threads on the bolt, and the threaded end of the bolt is provided with longitudinally extending slots 53 in the threads through which the tongues 52 may slide after the cup has been rotated sufficiently and is being moved upwardly over the end of the bolt. It will be understood that when this construction, which resembles in some respects a breach lock, is employed, the cup may be effectively locked against rotation at any point on the bolt by merely permitting the cup to turn back a part of one revolution, whereupon the tongues 52 will tightly wedge into those portions of the angularly disposed threads bordering upon the slots 53.

I claim:

1. In a device of the class described, a bolt, a tubular nut having an annular flange adjacent one end of the same, a coil spring encircling the tubular portion of the nut for automatically advancing the nut on the bolt, and a centrally apertured spring-encasing cup of cylindrical form positioned with the cylindrical side of the same rotatably mounted on the flange of the nut and with the apertured bottom of the same rotatably mounted on the tubular portion.

2. In a device of the class described, a bolt, a nut, a coil spring for automatically advancing the nut on the bolt, a connection between one end of the spring and the nut, a spring-encasing member, a connection between the other end of the spring and the member, and means for locking the member against rotation relative to the bolt.

3. In a device of the class described, a bolt, a nut, a coil spring for automatically advancing the nut on the bolt, a connection between one end of the spring and the nut, a spring-encasing member, a connection between the other end of the spring and the member, and means on the member coactable with one of the parts adapted to be clamped by the bolt for locking the member against rotation relative to the same.

4. In a device of the class described, a bolt, a nut, a coil spring for automatically advancing the nut on the bolt, a connection between one end of the spring and the nut, and a sheet metal spring-encasing member having an outwardly displaceable tongue punched in the side of the same to provide a shielded aperture through which the other end of the spring may be hooked.

5. In a device of the class described, a bolt, a nut, a coil spring for automatically advancing the nut on the bolt, a connection between one end of the spring and the nut, and a sheet metal spring-encasing member having a plurality of outwardly displaceable tongues punched in the side at intervals circumferentially of the same to provide at any desired one of the tongues a shielded aperture through which the other end of the spring may be hooked.

6. In a device of the class described, a bolt, a nut, a coil spring for automatically advancing the nut on the bolt, a connection between one end of the spring and the nut, a sheet metal spring-encasing member, a connection between the other end of the spring and the member, and a projection on the member for locking the same against rotation in one direction by abutting tangentially of the member against a shoulder on one of the parts adapted to be clamped by the bolt.

7. In a device of the class described, a bolt, a tubular nut, a coil spring encircling the nut for automatically advancing the nut on the bolt, a centrally apertured spring-encasing cup seated over the nut, and a split ring removably seated in an annular groove in the nut at one side of the cup for holding the latter in position relative to the nut.

8. In a device of the class described, a bolt adapted to pass through both a relatively stationary member and a relatively movable member, a nut adapted to apply pressure to the movable member, and a spring for automatically advancing the nut on the bolt, the portion of the bolt adapted to pass through the movable member being reduced in diameter whereby to facilitate movement of such member axially of the bolt under the pressure of the nut.

9. In a device of the class described, a bolt, a nut, and a coil spring for automatically advancing the nut on the bolt, the threading on the bolt and nut being multiple and having a lead which is from three to six times the pitch, for the purpose set forth.

In testimony whereof I have hereunto subscribed my name.

GUSTAV C. MONCKMEIER.